Oct. 31, 1961 E. J. SJOBERG 3,006,786

PHOTO-EMISSIVE SURFACES

Filed Dec. 1, 1958

Inventor
E. J. Sjoberg
By Glascock Downing & Seebold
Attys.

3,006,786

PHOTO-EMISSIVE SURFACES

Eric James Sjoberg, London, England, assignor to Electric & Musical Industries Limited, Hayes, Middlesex, England, a company of Great Britain Filed Dec. 1, 1958, Ser. No. 777,339
Claims priority, application Great Britain Dec. 6, 1957
18 Claims. (Cl. 117—219)

Figures 1, 2:
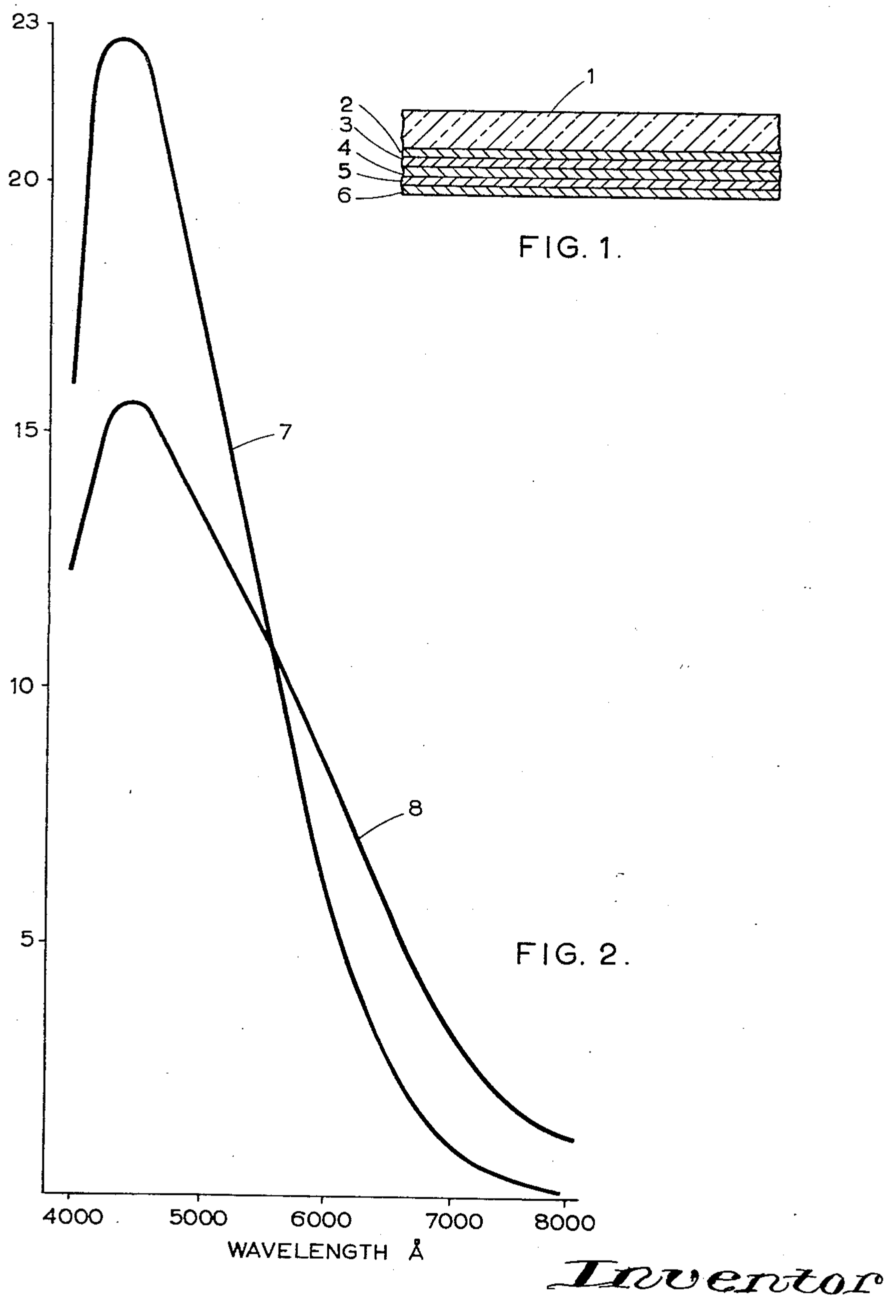

This invention relates to photo-emissive surfaces such as photo-cathodes or photo-mosaics suitable for use in photo-electric multipliers and television pick-up tubes and to methods of making such surfaces.

A photo-emissive surface has been proposed comprising a layer or film of antimony which is sensitized by two or three alkali metals of the group consisting of sodium, potassium, caesium and lithium. A photo-emissive surface of this kind has a peak response in the blue region of the spectrum and whilst the response of such a surface may be suitable for some purposes nevertheless for other purposes it may be found that the response in such a region is not sufficiently high.

Accordingly the object of the present invention is to provide an improved photo-emissive surface which has a greater response in the blue region of the spectrum compared with a photo-emissive surface of the kind referred to above.

According to one feature of the invention there is provided a photo-emissive surface formed from tellurium, antimony and three or more different alkali metals.

According to another feature of the invention there is provided a photo-emissive surface comprising tellurium sensitised with an alkali metal, antimony or a compound or alloy thereof deposited thereon, and sensitised with two or more alkali metals, all of said alkali metals being different.

According to another feature of the invention there is provided a photo-emissive surface comprising caesium or rubidium telluride having thereon antimony or a compound or alloy thereof, the antimony or compound or alloy thereof being sensitised with two or more alkali metals and which are different from the alkali metals of said telluride.

Preferably the alkali metals for sensitising the antimony, compound or alloy thereof are sodium and potassium.

According to yet another feature of the invention there is provided a method of making a photo-emissive surface which comprises depositing tellurium onto a surface, sensitising said tellurium by depositing thereon an alkali metal, depositing thereon antimony or a compound or alloy thereof and then sensitising said antimony or compound or alloy thereof by the deposition thereon of two or more alkali metals all of said alkali metals being different.

In order that the said invention may be clearly understood and readily carried into effect, it will now be more fully described with reference to the accompanying drawings, in which:

FIGURE 1 is a cross-sectional view of a portion of a photo-emissive surface made in accordance with the invention, and FIGURE 2 illustrates the photo-emissive response curves of a surface in accordance with the invention and of a surface such as has previously been proposed.

In carrying the invention into effect according to one embodiment of the invention for the formation of a continuous photo-emissive surface on the glass end wall or window 1 of an envelope which may be the envelope of a photo-electric multiplier or the envelope of a television pick-up tube, the envelope is first evacuated and degassed until a pressure is obtained which is less than $10^{-6}$ mm.

Hg. This order of vacuum is maintained during the whole of the processing stages in the formation of said surface. A layer 2 of tellurium is evaporated onto the window 1 from a boat containing tellurium which is inserted into the envelope so as to face said window 1, the boat being suitably heated so as to cause evaporation of the tellurium. The thickness of the tellurium layer so deposited should have an optical opacity of about 60%. After deposition of the tellurium layer the latter is sensitised with caesium indicated at 3 which may be distilled into the envelope from a source of caesium contained in a side tube provided on the envelope and with the envelope maintained at a temperature of about 160° C. During the distillation process the photo-sensitivity of the layer is measured and when a peak sensitivity of about 1 microampere per lumen is achieved the distillation is stopped and the caesium side tube is sealed off from the envelope. The caesium combines with the tellurium to form caesium telluride. During the caesium distillation process and in fact until all of the subsequent steps are completed the envelope is continuously evacuated as aforesaid to the above mentioned degree of vacuum. The layer at this stage has a yellow-green appearance and has an optical opacity of about 15–20%. Then a layer 4 of antimony is evaporated onto the caesium telluride layer. The layer of antimony may be evaporated from a source of such material which is contained in a boat or suitable evaporator which can be heated so that the material is evaporated onto the caesium telluride layer. The evaporation of said material is effected until the optical opacity of the composite layer so formed is about 70%. The deposition of the antimony is effected whilst the caesium telluride layer is at room temperature. The composite layer so formed is thereafter sensitised with sodium indicated at 5 in FIGURE 1 whilst the layer is at a temperature of about 220° C. and distillation of the sodium which may be effected from another side tube on the envelope is continued until a sensitivity of 10–22 microamperes per lumen is obtained. The sensitivity of the layer when sensitised with sodium is not the peak sensitivity which can be obtained, and the figure quoted for the sensitivity after sensitisation with sodium is about half the maximum sensitivity. The sensitisation with sodium may be effected within about fifteen minutes. The composite layer after sensitisation with sodium has a yellow-gold colour and light reflected from the surface has a visible component of red. The composite layer formed as above described is finally sensitised with potassium indicated at 6 in FIGURE 1 whilst the layer is at a temperature of from 140–170° C. The potassium may be distilled into the envelope from a further side tube until maximum sensitivity is obtained which will usually lie in the range between 60–80 microamperes per lumen. Sensitisation with potassium may be effected within six to ten minutes. The side tube containing the source of potassium is then sealed off and if maximum sensitivity has not been passed the envelope may be allowed to cool to room temperature. If however maximum sensitivity has been passed due to an excess of potassium the envelope is baked to 160–180° C. until maximum sensitivity is obtained and then allowed to cool. In either case an increase in sensitivity results to bring the layer up to about 130 microamperes per lumen.

Photo-emissive surfaces made in the manner described above have a high sensitivity to radiation in the wavelength interval of 4,000–5,500 A. units. FIGURE 2 of the accompanying drawings illustrates curves showing the spectral response of photo-emissive materials deposited on supports of glass made of the material known by the registered trademark "Pyrex," the curve 7 indicating the photo-emissive response of a surface made in the manner above described whilst the curve 8 indicates the photo-emissive response of a photo-emissive surface formed of antimony sensitised with sodium, potassium and caesium. In this curve the ordinates represent the spectral sensitivity in arbitrary units whilst the abscissae are wavelengths in A. units. It will be seen that the response of the surface in accordance with the invention in the region between 4,000–5,500 A. units is substantially greater compared with a surface of antimony sensitised with sodium, potassium and caesium.

Instead of employing caesium telluride as described above rubidium telluride may be used which is formed in a manner similar to that described above by first depositing a layer of tellurium until the optical opacity thereof is about 60%, such layer being then sensitised with rubidium until the layer has an optical opacity of 15–20%. Further instead of using antimony, indium antimonide or bismuth antimonide may be employed or an alloy of antimony and indium or antimony and bismuth. When an alloy of antimony and indium is employed the proportion of antimony to indium may be 12:1 and when an alloy of antimony and bismuth is employed the proportion of antimony to bismuth may be 6:1. The compound or alloy of antimony may be deposited in the manner above described until the optical opacity is about 70% and whilst the telluride layer is at room temperature.

Although in the above description the antimony, compound or alloy thereof is sensitised with sodium and potassium, it will of course be appreciated that the antimony, compound or alloy thereof may be sensitised with more than two different alkali metals and other alkali metals may be employed such as caesium, lithium or rubidium providing the metals employed are different from the metal which is employed to sensitise the tellurium layer, although the composition of the photo-emissive surface as described in connection with FIGURE 1 of the drawings is found to afford the best results.

Although in the above description a continuous photo-emissive surface is described which is suitable for use as a photo-cathode in a photo-electron multiplier or as the photo-electric cathode of a television pick-up or similar tube, it will of course be appreciated that the invention is equally applicable to the manufacture of photo-emissive mosaics such as are employed in television pick-up tubes and in the manufacture of such a mosaic the mosaic elements may be formed by evaporation through a suitable stencil onto a support.

What I claim is:

1. A photo-electric device comprising a support, a photo-emissive surface on said support having a peak sensitivity in the spectral region 4,000–5,500 A. units and comprising tellurium, antimony and at least three different alkali metals.

2. A photo-electric device comprising a support, a photo-emissive surface on said support comprising tellurium sensitised with an alkali metal having thereon a substance selected from the group consisting of antimony, a compound thereof and an alloy thereof, said substance being sensitised with at least two alkali metals all of said alkali metals being different.

3. A photo-electric device according to claim 2, wherein the alkali metals employed to sensitise said substance are sodium and potassium.

4. A photo-electric device comprising a support, a photo-emissive surface on said support comprising a base material selected from the group consisting of caesium and rubidium telluride having thereon a substance selected from the group consisting of antimony, a compound thereof and an alloy thereof, said substance being sensitised with at least two alkali metals which are different from the alkali metal of said base material.

5. A photo-electric device according to claim 1 wherein the alkali metals employed to sensitise said substance are sodium and potassium.

6. A photo-electric device comprising a support, a photo-emissive surface on said support comprising tellurium sensitised with an alkali metal and having thereon a substance selected from the group consisting of indium antimonide, bismuth antimonide, an alloy of antimony and indium and an alloy of antimony and bismuth, said substance being sensitised with at least two alkali metals all of said alkali metals being different.

7. A method of making a photo-emissive surface which comprises depositing tellurium onto a surface, sensitising said tellurium by depositing thereon an alkali metal, depositing thereon a substance selected from the group consisting of antimony, a compound thereof and an alloy thereof and then sensitising said substance by the deposition thereon of at least two alkali metals all of said alkali metals being different.

8. A method according to claim 7, wherein the alkali metal employed to sensitise said tellurium is selected from the group consisting of caesium and rubidium.

9. A method according to claim 8 wherein said tellurium is sensitised at a temperature of about 160° C.

10. A method according to claim 8 wherein sensitisation of said tellurium is continued until peak sensitivity is reached.

11. A method according to claim 7, wherein said substance is deposited on the sensitised tellurium whilst the latter is at room temperature.

12. A method according to claim 7 wherein one of the alkali metals employed to sensitise said substance is sodium.

13. A method according to claim 12, wherein sensitisation with sodium is effected at a temperature of about 220° C.

14. A method according to claim 13 wherein the sensitisation with sodium is stopped before peak sensitivity is obtained.

15. A method according to claim 12, wherein subsequent to sensitisation with sodium, potassium is deposited onto the sodium.

16. A method according to claim 15 wherein sensitisation with potassium is effected with the surface at a temperature of from 140–170° C.

17. A method according to claim 15 wherein the surface sensitised with potassium is baked to 160–180° C. to remove an excess of potassium.

18. A method of making a photo-emissive surface which comprises depositing tellurium onto a support, sensitising said tellurium by depositing thereon caesium until peak sensitivity is reached, depositing antimony thereon whilst the sensitised tellurium is at room temperature, sensitising said antimony with sodium before peak sensitivity is obtained and then depositing potassium thereon.

References Cited in the file of this patent

UNITED STATES PATENTS

| | | |
|---|---|---|
| 2,770,561 | Sommer | Nov. 13, 1956 |
| 2,847,329 | Schilberg et al. | Aug. 12, 1958 |